United States Patent
You

(10) Patent No.: US 10,894,357 B2
(45) Date of Patent: Jan. 19, 2021

(54) THREE-DIMENSIONAL PRINTER OF FUSED DEPOSITION MODELING

(71) Applicant: ROKIT HEALTHCARE INC., Seoul (KR)

(72) Inventor: Seok Hwan You, Seoul (KR)

(73) Assignee: ROKIT HEALTHCARE INC., Seoul (KR)

( * ) Notice: Subject to any disclaimer, the term of this patent is extended or adjusted under 35 U.S.C. 154(b) by 45 days.

(21) Appl. No.: 16/337,219

(22) PCT Filed: Aug. 21, 2017

(86) PCT No.: PCT/KR2017/009097
§ 371 (c)(1),
(2) Date: Mar. 27, 2019

(87) PCT Pub. No.: WO2018/038486
PCT Pub. Date: Mar. 1, 2018

(65) Prior Publication Data
US 2020/0039140 A1 Feb. 6, 2020

(30) Foreign Application Priority Data
Aug. 23, 2016 (KR) .................. 10-2016-0107193

(51) Int. Cl.
*B29C 64/20* (2017.01)
*B29C 64/209* (2017.01)
(Continued)

(52) U.S. Cl.
CPC ............ *B29C 64/20* (2017.08); *B29C 64/209* (2017.08); *B29C 64/245* (2017.08);
(Continued)

(58) Field of Classification Search
CPC ..... B29C 64/20; B29C 64/209; B29C 64/118; B29C 64/106; B33Y 30/00
See application file for complete search history.

(56) References Cited

U.S. PATENT DOCUMENTS 8,827,684 B1 * 9/2014 Schumacher ......... B29C 64/209
425/375
2016/0096327 A1 * 4/2016 Fry ....................... B29C 64/295
264/443
(Continued)

FOREIGN PATENT DOCUMENTS

CN 203622955 U * 6/2014
CN 105291437 A 2/2016
(Continued)

OTHER PUBLICATIONS

Search Report and Written Opinion issued in corresponding parent application PCT/KR2017009097 by the international searching authority dated Dec. 28, 2017. (Year: 2017).*
(Continued)

*Primary Examiner* — Joseph S Del Sole
*Assistant Examiner* — Jerzi H Moreno Hernandez
(74) *Attorney, Agent, or Firm* — Osha Bergman Watanabe & Burton LLP

(57) ABSTRACT

Disclosed are a three-dimensional printer of a fused deposition modeling and software setting values thereof, which blocks transmitting calories of a nozzle upwards and simultaneously heats a lower aluminum output plate at a high temperature to locally transfer heat in a sandwich form to where an output proceeds, such that it is possible to realize miniaturization of engineering plastic printing at low energy, prevent the shrinkage of a printed object, and maximize adhesive strength between layers, wherein the three-dimensional printer is further provided with a nozzle made of SUS having excellent heat resistance to use an engineering plastic (Continued)

filament having a high melting temperature and obtain optimal quality within a numerical range of predefined software setting values, wherein the output plate is provided with a hard anodized aluminum plate so that both commodity plastic and engineering plastic material can be used without a need to attach an additional special sheet.

4 Claims, 6 Drawing Sheets

(51) Int. Cl.
  *B33Y 30/00* (2015.01)
  *B29C 64/245* (2017.01)
  *B29C 64/106* (2017.01)
  *B29C 64/118* (2017.01)

(52) U.S. Cl.
  CPC ............ *B29C 64/106* (2017.08); *B29C 64/118* (2017.08); *B33Y 30/00* (2014.12)

(56) References Cited

U.S. PATENT DOCUMENTS

| | | | |
|---|---|---|---|
| 2016/0101463 A1 | 4/2016 | Snyder et al. | |
| 2016/0266573 A1* | 9/2016 | Bheda | B29C 64/106 |
| 2019/0134913 A1* | 5/2019 | Buratto | B29C 64/386 |

FOREIGN PATENT DOCUMENTS

| | | | | |
|---|---|---|---|---|
| CN | 205202190 U | | 5/2016 | |
| CN | 205364571 U | | 7/2016 | |
| KR | 20110021871 A | * | 3/2011 | ........... B29C 64/106 |
| KR | 20150053421 A | * | 5/2015 | |
| KR | 20160052199 A | * | 5/2016 | ........... B29C 64/209 |
| WO | WO-2015060923 A1 | * | 4/2015 | ........... B29C 64/393 |

OTHER PUBLICATIONS

Extended European Search Report issued in corresponding European Application No. 17843906.3 dated Mar. 11, 2020 (7 pages).
Office Action issued in Corresponding CN Application No. 201780065053.3 with English translation dated Sep. 18, 2020 (16 pages).

* cited by examiner

[FIG. 1]
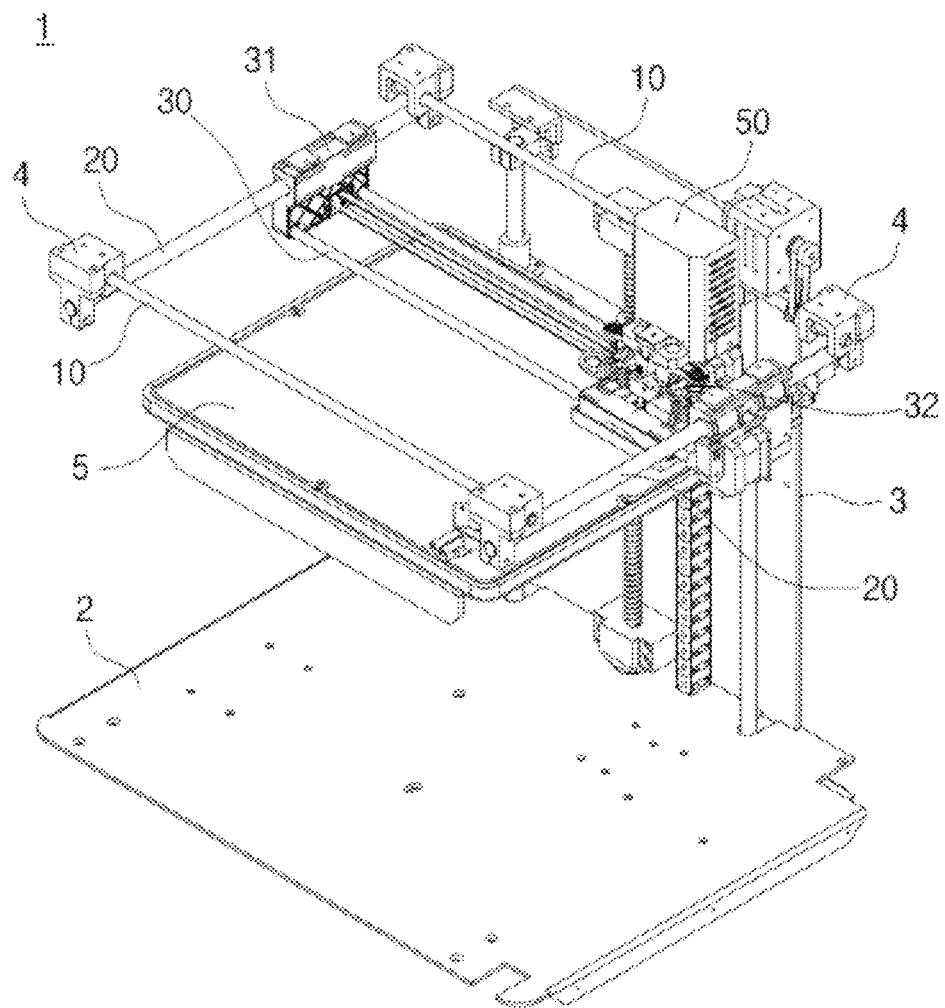

[FIG. 2]
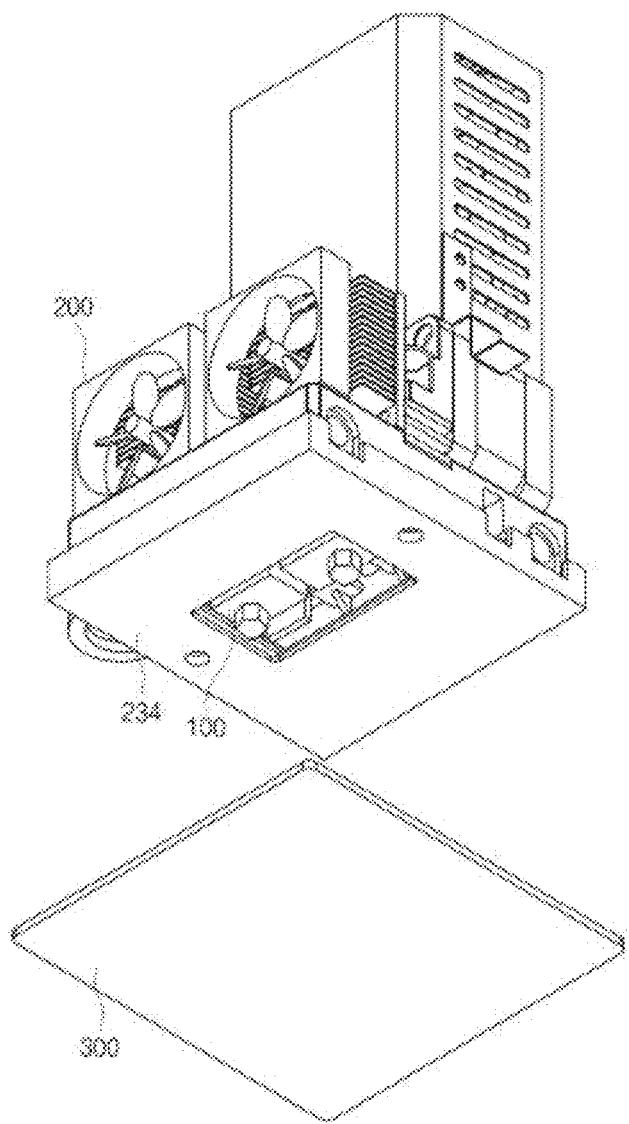

[FIG. 3]
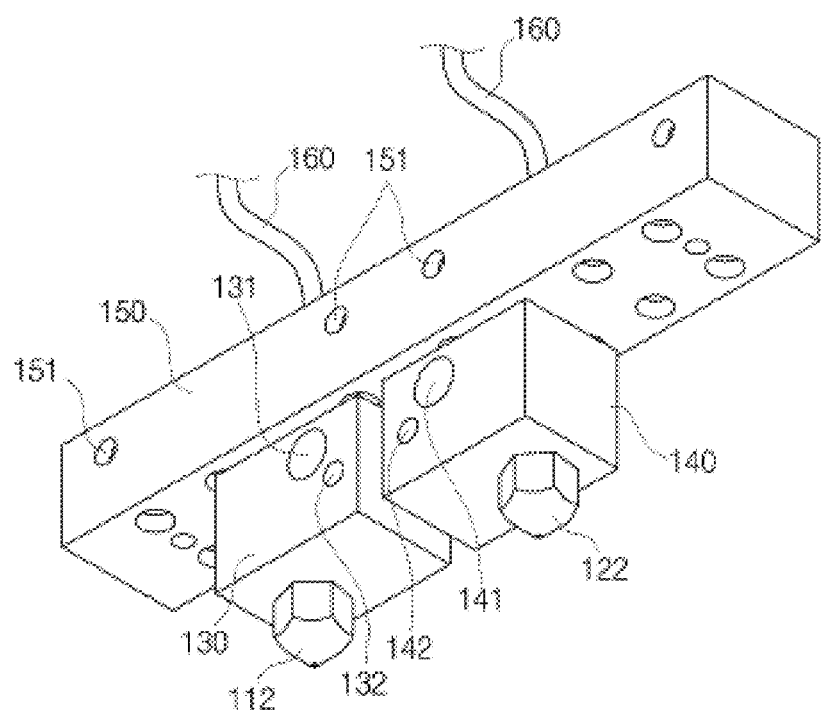

[FIG. 4]
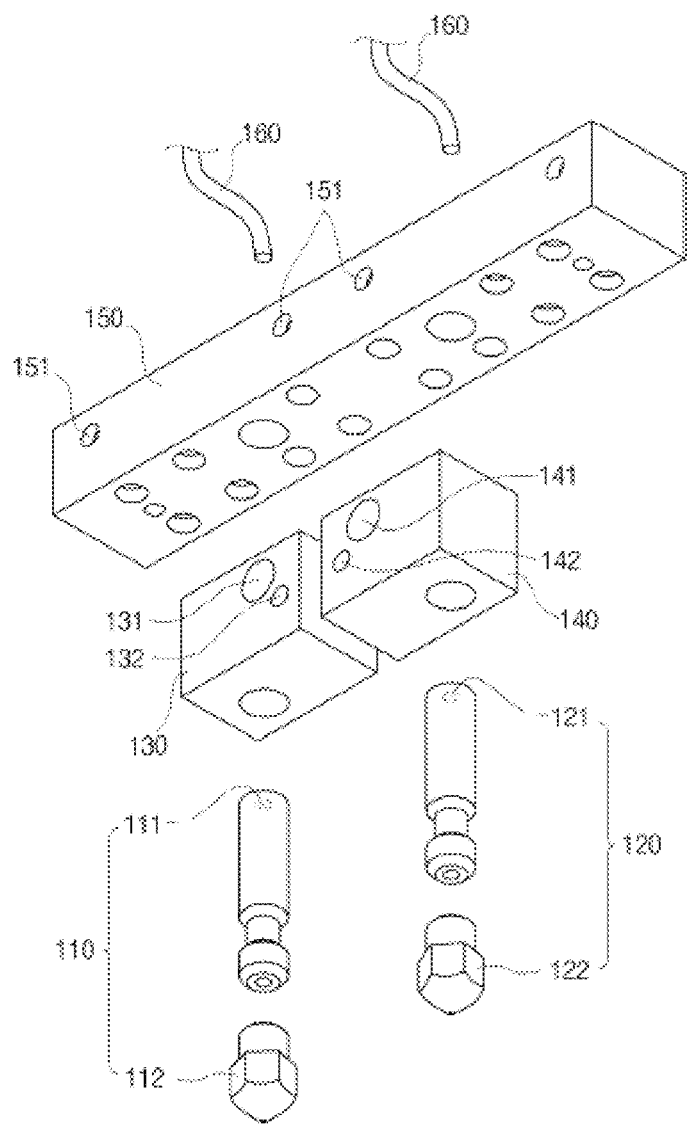

[FIG. 5]
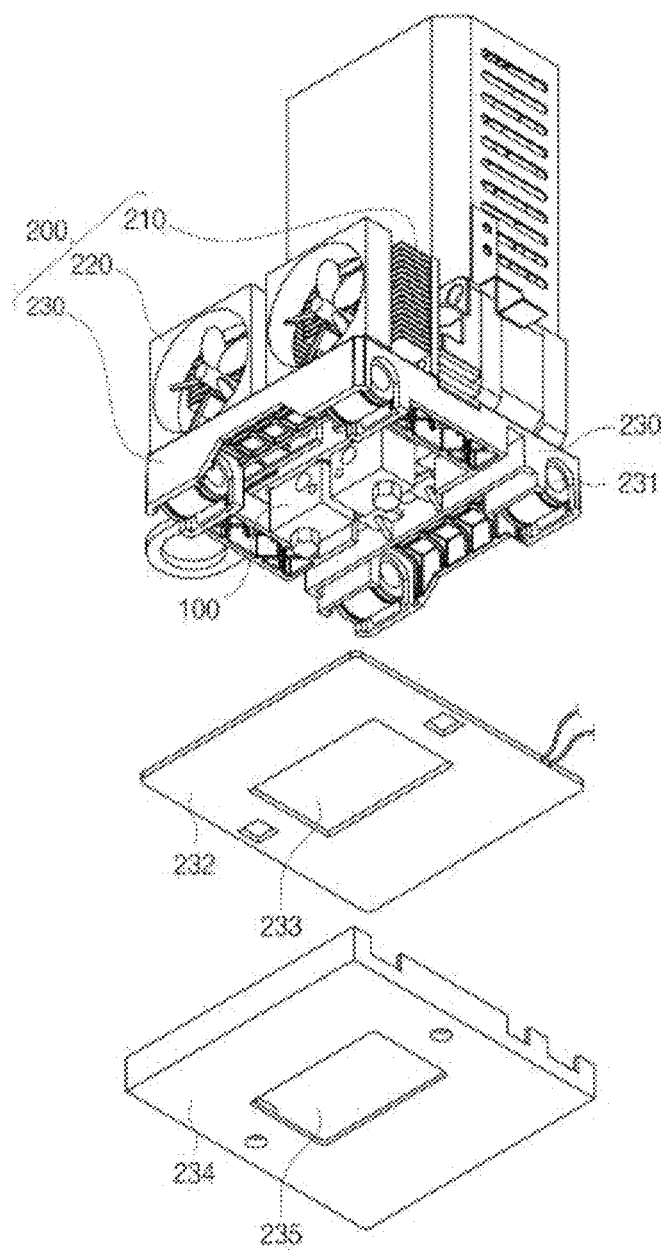

[FIG. 6]
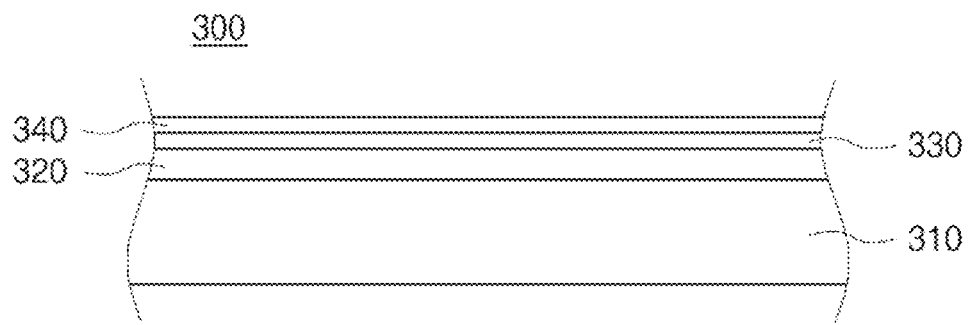
[FIG. 7]
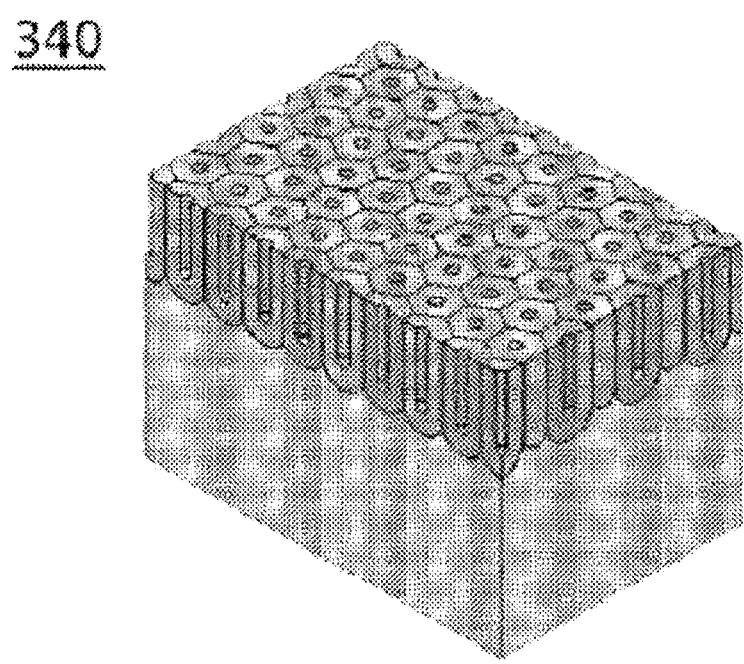

THREE-DIMENSIONAL PRINTER OF FUSED DEPOSITION MODELING

TECHNICAL FIELD

The present invention relates to a three-dimensional printing technology, and more specifically, to a three-dimensional printer of a fused deposition modeling which uses an engineering plastic filament having a high melting temperature, secures stability of a printed object and durability of adhesive strength between three-dimensional layers even in high-temperature printing, and uses minimum energy due to partial heating and thus is miniaturized.

BACKGROUND ART

Recently, research on not only two-dimensional printers (2D printer) but also three-dimensional printers (3D printers) capable of printing three-dimensional objects has been actively proceeding.

A three-dimensional printer is equipment configured to manufacture a three-dimensional object by stacking a material such as a polymer (resin) in a liquid or powder form, a metal, or the like in a layer-by-layer method according to design data.

The above originates from rapid prototyping (RP) which is a technology for quickly modeling a shape desired to be manufactured according to a three-dimensional graphic application program using a laser and a powder material. The above concept is the opposite of subtractive manufacturing for producing three dimensional materials using a method of cutting or shaving using machining or a laser.

Generally, methods of a three-dimensional printer configured to three-dimensionally manufacture products by printing include a stereolithography (SLA) method which is a liquid-based method, a selective laser sintering (SLS) method which is a powder-based method, and a fused deposition modeling method (hereinafter, referred to as an FDM method) which is a solid-based method.

In the FDM method, a fine filament-shaped thermoplastic material is stacked using a method of melting the fine filament-shaped thermoplastic materials in a nozzle and printing it in a thin film shape. The nozzle radiates high-temperature heat capable of melting plastic and the plastics should be curable at room temperature. Further, since a structure and an operating method of an apparatus are simple in comparison with other methods of implementing a three-dimensional printer, equipment costs and maintenance costs are low.

Various plastic materials are used for the filament, and polylactic acid (PLA), acrylonitrile butadiene styrene (ABS), nylon, polyurethane, and the like are conventional plastics that have been used as the main material. However, the filament should not be made of a commodity plastic but rather an engineering plastic to satisfy the demands of consumers who desire finished goods having high durability and thermal resistance, so that the filament can be applied to products or prototypes in machinery, vehicles, the medical field, the construction field, and the electronics field, and in order to print such an engineering plastic with commercial quality, large-sized expensive three-dimensional printer equipment which requires a long waiting time before printing and consumes a large amount of energy for high temperature printing is necessary.

Engineering plastics have high stability due to high strength, chemical resistance, thermal resistance, steam resistance, and the like against various extreme environments in comparison with commodity plastics, and thus are used in various industrial fields, and more specifically, since commodity plastics have melting temperatures less than or equal to 250° C. while engineering plastics have high melting temperatures greater than or equal to 300° C. and are very sensitive to an ambient temperature during fusion, shrinkage of a printed object due to rapid cooling during a printing process in which a large temperature decrease in a nozzle part occurs should be prevented, the ambient temperature should be maintained high so that adhesive strength between layers is sufficient during printing, and all components in the nozzle and the printer should be designed to maintain stability and durability in a high-temperature environment. In the present invention, Celsius is used as a temperature scale.

Accordingly, although a conventional FDM method three-dimensional printer using an engineering plastic has a structure in which the inside is completely sealed and thus shrinkage of the plastic is prevented and stacking strength between the layers is improved in a fusion and air-cooling process of the nozzle part by heating it to 180° C. for a long time, in this method, even when the printed object is small in size, the temperature of all inner air having a significantly large size should be heated to 180° C., and further, to this end, since an initial preheating time greater than or equal to four hours is necessary, a cooling time necessary to remove the printed object from a bottom surface after the printing is also greater than or equal to four hours, costs of printing materials and replaceable consumable components are high, an amount of power necessary for heating the inside is very large, costs of equipment are high, and the like, popularization in industrial fields is distant.

Further, a conventional FDM method three-dimensional printer using an engineering plastic is designed with a special sheet spread out to prevent the shrinkage of the plastic on a printing plate and a vacuum suction system is mounted in a downward direction so that the printed object is attached to a sheet by a pressure, and to this end, since a separate vacuum chamber is necessary and the special sheet should be replaced after the printed object is manufactured, overall manufacturing costs increase due to a manufacturing time, personnel expenses, the expensive special sheet, and the like.

DISCLOSURE

Technical Problem

The present invention is directed to providing a three-dimensional printer of a fused deposition modeling which prevents transmission of heat quantity generated from a nozzle in an upward direction and heats an aluminum printing plate at a lower end thereof at a high temperature to locally transfer heat in a sandwich form to a part at which printing is performed and thus implement miniaturization of engineering plastic printing using low energy, removes shrinkage of a printed object, maximizes adhesive strength between layers, is capable of using an engineering plastic filament having a high melting temperature because a nozzle made of a stainless steel (SUS) material having excellent thermal resistance is additionally provided, obtains optimal quality within a numerical range according to a defined software setting value, and has a printing plate in which a hard anodized aluminum plate is provided and thus both a commodity plastic material and an engineering plastic material are usable without attaching a separate special sheet, and a software setting value.

Technical Solution

One aspect of the present invention provides a three-dimensional printer of a fused deposition modeling including a nozzle part configured to heat a filament to a sufficient temperature to eject the filament onto a printing plate, a cooling part provided on the nozzle part to cool the nozzle part, and the printing plate on which the filament ejected from the nozzle part is stacked, wherein the nozzle part includes a first nozzle provided with a first introduction hole connected to a nozzle tube into which the filament is inserted and a first ejection part configured to eject the filament, and a first aluminum core coupled to the first nozzle to heat the filament introduced from the first introduction hole, wherein the cooling part includes a lower plate having a through hole formed therein so that the first nozzle is fitted thereinto, provided with a thermal plate configured to generate high-temperature heat, and having an upper surface to which a ceramic paper is attached, the printing plate includes a silicon thermal plate configured to apply heat to a printed object stacked at an upper side, the thermal plate locally applies heat to an upper side of the printed object stacked on the printing plate, and the silicon thermal plate locally applies heat to a lower side of the printed object.

Advantageous Effects

According to the above-described three-dimensional printer of a fused deposition modeling of the present invention, an engineering plastic filament having a high melting temperature can be ejected using a nozzle made of a stainless steel (SUS) material having high thermal durability. Accordingly, the three-dimensional printer can secure stability and durability even at a high temperature which is greater than or equal to melting temperatures of conventional commodity plastics.

Further, in the present invention, since a printed object is locally heated by an aluminum core configured to heat the filament to a sufficient temperature, a thermal plate provided on the printed object, and a printing plate provided under the printed object, power consumption can be significantly reduced, equipment can be miniaturized, and when an engineering plastic is used for the filament, adhesive strength between layers of the printed object can be improved and shrinkage can be prevented by deviating from a conventional method in which the inside of a chamber is wholly heated.

Finally, high strength of the printed object due to printing parameter settings optimized to efficiently reduce power consumption can be implemented, and a printed object having optimum quality can be obtained.

DESCRIPTION OF DRAWINGS

FIG. 1 is a perspective view illustrating a three-dimensional printer of a fused deposition modeling according to the present invention.

FIG. 2 is a perspective view illustrating a nozzle part, a cooling part, and a printing plate in FIG. 1.

FIG. 3 is a perspective view illustrating the nozzle part in FIG. 2.

FIG. 4 is an exploded perspective view of the nozzle part in FIG. 3.

FIG. 5 is a perspective view illustrating the nozzle part and the cooling part in FIG. 2.

FIG. 6 is a cross-sectional view illustrating a printing plate in FIG. 2.

FIG. 7 is a cross-sectional perspective view illustrating a stacking structure observed by expanding a surface of the printing plate in FIG. 2.

MODES OF THE INVENTION

Embodiments of the present invention will be described with reference to sufficiently aid in understanding the present invention. The embodiments of the present invention may be modified to various shapes, and a scope of the present invention should not be limited to embodiments described below in detail. Embodiments of the following description are provided to more completely describe the following description to those skilled in the art. Accordingly, a shape, a size, and the like of elements in the drawings may be exaggerated for a more clear description. A case in which the same members in each of the drawings may be shown as the same reference numeral exists. Further, detailed descriptions of disclosed functions and configurations which may unnecessarily obscure the spirit of the present invention will be omitted.

The present invention was invented due to a necessity for improved technologies to be applied to a nozzle which may secure stability and durability at even a high temperature which is greater than or equal to a temperature in which a conventional commodity plastic is melted to print from a 3D printer using an engineering plastic having a high melting temperature, a printing plate apparatus configured to prevent a printed object from dropping to a floor or deformation due to shrinkage, a cooling apparatus configured to maintain stability of an inner polycrystalline diamond (PCD) and a driving part in a high-temperature environment, and the like.

As shown in FIG. 1, a three-dimensional printer of a fused deposition modeling 1 (hereinafter, referred to as a three-dimensional printer) according to the present invention is provided with a quadrangular-shaped horizontal base frame 2 configured to support a basic structure and maintain a stable state, and vertical frames 3 are fixed to the front and rear of the horizontal base frame 2. For reference, in the case of FIG. 1, only a rear vertical frame 3 is shown for convenience so that the inside may be seen, the frames 2 and 3 are fixed to and located at the inside of a three-dimensional printer case which is not shown.

In this case, guide brackets 4 are fixed to upper edges of the case and a pair of right and left guide bars 10 in a lateral direction and a pair of front and rear guide bars 20 are fixed to the guide brackets 4.

Front and rear transferring block 31 are connected to the front and rear guide bars 20 to slidingly move, and in this case, transference guide bars 30 disposed in parallel with the right and left guide bars 10 are fixed to the front and rear transferring block 31.

A step motor (not shown) for precise control is provided in each of the front and rear transferring block 31, the transference guide bars 30 fixed to the front and rear transferring block 31 slidingly move through the control of the step motor to be accurately located in a lateral direction.

Similarly, a right and left transferring block 32 is connected to the transference guide bars 30 to slidingly move, a step motor (not shown) is provided in the right and left transferring block 32, and the right and left transferring block 32 slidingly moves through control of the step motor to be accurately located in a lateral direction.

Further, a printing head 50 configured to supply a filament is installed on the right and left transferring block 32, and as described above, the printing head 50 may accurately control positioning on a flat surface due to sliding movement of the front and rear transferring block 31 and the right and left transferring block 32.

In addition, a nozzle part 100 (shown in FIG. 2) provided with two nozzles each having a predetermined diameter and configured to eject a filament heated at a melting temperature at a transferred position is provided in the printing head 50, and a printing plate 300, in which the filament ejected from the nozzle is hardened, is provided under the printing head 50.

In this case, since the printing plate 300 is spaced apart from the initial nozzle at a predetermined interval, the filament ejected from the nozzle is fixed to an upper end of the printing plate 300 and hardened, and then the printing plate 300 descends at a predetermined interval. Further, since a filament is ejected from the nozzle again and hardened on the hardened filament, a particular shape is formed by sequentially hardened filaments and thus a desired product may be manufactured.

Hereinafter, a technology in which an engineering plastic may be used through additional configurations without heating all air in a case according to the present invention unlike a conventional art will be described.

FIG. 2 is a perspective view illustrating a nozzle part, a cooling part, and a printing plate of the three-dimensional printer according to the present invention. As shown in FIG. 2, the three-dimensional printer of a fused deposition modeling according to the present invention includes a nozzle part 100 configured to heat a filament to a sufficient temperature and eject the filament onto the printing plate, a cooling part 200 provided on the nozzle part 100, and a printing plate 300 configured to harden the filament ejected from the nozzle 100 thereon and prevent shrinkage of the filament.

FIG. 3 is a perspective view illustrating the nozzle part of the present invention and FIG. 4 is an exploded perspective view of the nozzle part in FIG. 3. As shown in FIGS. 3 and 4, the nozzle part 100 includes a first nozzle 110 provided with a first introduction hole 111 connected to a nozzle tube 160 having an upper end into which the filament is introduced and a conical first ejection part 112 configured to eject the filament, a second nozzle 120 provided with a second introduction hole 121 connected to a nozzle tube 160 having the upper end into which the filament is introduced and a conical second ejection part 122 configured to eject the filament, a first aluminum core 130 coupled to the first nozzle 110 to heat the filament introduced from the first introduction hole 111, a second aluminum core 140 coupled to the second nozzle 120 to heat the filament introduced from the second introduction hole 121, and a rectangular mounting bar 150 coupled to the nozzles 110 and 120

In this case, a general filament made of a material which is Polylactic Acid (PLA), Acrylonitrile Butadiene Styrene (ABS), nylon, polyurethane, or the like which are generally used may be introduced into the first introduction hole 111, and a filament made of an engineering plastic material may be introduced into the second introduction hole 112. Accordingly, in the present invention, the pair of nozzles 110 and 120 may be provided to improve a working speed and a part forming a surface of a finished product may be formed of the commodity filament, and further, a frame part which requires durability may be formed of the engineering filament to accelerate the working speed of the finished product and enhance durability.

Further, the filament made of a commodity plastic material introduced into the first introduction hole 111 may be introduced into the second introduction hole 121, and accordingly, the two left and right nozzles may be used separately or simultaneously to improve the working speed.

Since the filament made of the commodity plastic material is softened at a high temperature, which is transferred by the first aluminum core 130, to be ejected, the first ejection part 112 of the first nozzle 110 may be formed of a brass material having high heat conductivity.

As described in the background art, the filament made of the engineering plastic material may be transformed in a nozzle formed of the brass material having a melting temperature greater than or equal to 350° C. Accordingly, since the filament made of the engineering plastic material is softened at a high temperature greater than or equal to 350° C. transferred by the second aluminum core 140 to be ejected, the second ejection part 122 of the second nozzle 120 may be formed of a stainless steel (SUS) material to stably print the above.

In the aluminum cores 130 and 140, thermal wire introduction holes 132 and 142 are formed to pass through the aluminum cores 130 and 140 so that a thermal wire (not shown) providing a high temperature is introduced, and further, sensor holes 132 and 142 into which temperature sensors (not shown) configured to check a temperature of each of the aluminum cores 130 and 140 are introduced are formed to be recessed therein.

Further, in the aluminum cores 130 and 140, a ceramic paper having a high heat insulation effect is attached to an outer surface to minimize heat loss so that heat supplied from the thermal wire is not radiated to the outside and intensively transferred to the nozzles 110 and 120.

A filament step motor (not shown) connected to the nozzle tube 160 into which the filament is introduced and configured \ to push the filament into the nozzle tube with a precise pressure at one side of the nozzle tube 160 is formed in each of the introduction holes 111 and 121 of the nozzle. Since operation implementation of the filament step motor is apparent to those skilled in the art, a detailed description will be omitted.

FIG. 5 is a perspective view illustrating the nozzle part and the cooling part of the present invention. As shown in FIG. 5, the cooling part 200 may include a radiating plate 210, a fan 220 configured to cool the radiating plate 210, and a transferring member 230 made of aluminum.

The radiating plate 210 is coupled to the mounting bar 150 and the filament step motor or the nozzle tube 160 to lower the temperature transferred from the aluminum cores 130 and 140. Accordingly, a problem, in which the filament is softened in the filament step motor before reaching the nozzles 110 and 120 and thus may not be supplied to the nozzle tube with a predetermined pressure, may be solved.

Further, the transferring member 230 may be fitted into and fixed to a plurality of fixing holes 151 (see FIG. 4) formed in the mounting bar 150 to pass through the mounting bar 150 by a predetermined depth and a ceramic paper is attached to an outer surface of the transferring member 230 to prevent the high temperature transferred from the aluminum cores 130 and 140 from the mounting bar 150.

In addition, in an embodiment of the three-dimensional printer of a fused deposition modeling according to the present invention, a lower plate 232 made of an aluminum material and configured to cover a lower surface of the transferring member 230, except the nozzles 110 and 120, may be provided to prevent loss of a high temperature.

In detail, the lower plate 232 is coupled to the transferring member 230 so that a through hole 233 is formed in the lower plate 232 and the nozzles 110 and 120 are fitted thereinto. Accordingly, transference of high-temperature heat generated from the nozzles 110 and 120 by the lower plate 232 in an upward direction may be prevented. Further, a lower case 234 made of aluminum is bolt-coupled to the lower plate 232 at a lower end of the lower plate 232 to seal a lower portion of the cooling part 200. In this case, a through hole 235 into which the nozzles 110 and 120 are fitted is also formed in the lower case 234.

Since the lower plate 232 is made of the aluminum material and thus has a heat insulation effect in which the heat generated from the nozzles 110 and 120 does not ascend in an upward direction, a ceramic paper may be attached to an outer surface of the lower plate 232 to further improve the heat insulation effect.

Meanwhile, guide holes 231, which are configured to pass through the transferring member 230 so that the transference guide bars 30 (see FIG. 1) are fitted, are formed in the transferring member 230, and thus the mounting bar 150 may be transferred. Accordingly, locations of the nozzles 110 and 120 coupled to the mounting bar 150 may be precisely controlled. Since location control of the nozzles 110 and 120 is described in the background art and is not a characteristic of the present invention, a detailed description thereof will be omitted.

FIG. 6 is a cross-sectional view illustrating the printing plate 300 of the present invention. As shown in FIG. 6, the printing plate 300 is an area on which the filament ejected from the nozzles 110 and 120 is hardened and the finished product is laid, and a ceramic paper 320 is attached to an upper end of a flat plate 310, and after laying a silicon thermal plate 330 on the upper end, then a hard anodizing plate 340 is fixed using a bolt to prevent loss of heat due to transference to a lower portion of the printing plate 300 of the heat and uniformly spread the heat on a flat surface when the filament softened at an initial high temperature is disposed. For reference, the hard anodizing plate 340 has a shape shown in FIG. 7, and when the high-temperature filament is ejected, dropping on a floor and deformation due to shrinkage may be prevented.

Further, bimetal may be inserted into one side of the printing plate 300, and in this case, since a temperature of the printing plate 300 does not remain only in a particular portion and is uniformly spread on the flat surface, when the printing plate 300 is overheated, a printing process may be stopped due to an operation of the bimetal or overheating may be prevented by shutting off power. In addition, since a temperature sensor is attached to the one side of printing plate 300, the temperature of the printing plate 300 may be consistently checked.

Particularly, when the engineering plastic having the high melting temperature is used, a predetermined high-temperature state should be maintained in the printed object to prevent the shrinkage of the high-temperature filament ejected from the nozzle and maintain adhesive strength between layers. However, since heat generated from the printing plate 300, that is, from a floor, is not sufficiently transferred to an upper side in the printed object stacked on the printing plate 300 to a predetermined height, a crack due to shrinkage occurs at an upper portion of the printed object, and accordingly, adhesive strength at an upper end of the printed object of the filament decreases and thus defective products frequently occurs.

Accordingly, in another embodiment of the three-dimensional printer of a fused deposition modeling of the present invention, referring to FIG. 5 again, a thermal plate 236 configured to receive power to generate a high temperature may be inserted into the lower plate 232. In this case, the lower plate 232 may be controlled so that a temperature of the thermal plate 236 located therein may increase up to 200° C. and may be controlled to be operated only when the engineering plastic is used.

In this case, since the ceramic paper is attached to an upper surface (in a direction of the drawing) of the lower plate 232, transference of high-temperature heat generated from the thermal plate 236 in an upward direction may be prevented and the high-temperature heat may be locally transferred to the upper portion of the printed object which is located below.

Further, since heat is locally applied to the upper side of the printed object stacked on the printing plate 300 to the predetermined height when the engineering plastic is used, the engineering plastic filament ejected from the nozzle may be stably attached to the upper side of the printed object. Accordingly, the conventionally used air in the case does not have to be entirely heated, and since a preheating time and a cooling time may be decreased, the inside of the three-dimensional printer is maintained at an optimum temperature while the printed object is printed. Accordingly, both a commodity plastic material and an engineering plastic material may be used.

Accordingly, since the printed object obtains a sandwich heating effect due to heat generated from above and below by concentrating heat generated from the nozzles 110 and 120 in a downward direction and generating heat from the silicon thermal plate 330 of the printing plate 300, the temperature of the printed object may be maintained at a high temperature for a long time.

EXPERIMENTAL EXAMPLE

A test was performed to obtain a high quality printed object using an engineering plastic through the above-described configurations of the present invention, and quality comparable to quality from expensive equipment could be obtained using only a simple configuration.

Particularly, when the engineering plastic filament was used as an ejected material using the above configurations, a printed object having optimum quality within a numerical range according to parameters to be defined could be obtained. The parameters are defined below.

1. Nozzle temperature: a temperature of the second ejection part 122 configured to melt and discharge the engineering filament.

2. Printing plate temperature: a temperature of the printing plate 300 from which the printed object is printed.

3. Lower plate temperature: a temperature of the lower plate 232 configured to heat the filament printed in a state of being attached around the nozzle from the above, which may be adjusted by the thermal plate 236 located in the lower plate 232.

4. Layer height: a height of one layer when the printed object is cut by a predetermined height to be divided into a plurality of layers and stacked layer by layer from the second ejection part 122.

5. Surface thickness (edge width over height): a thickness of a surface of the printed object when an edge of the printed object, that is, the surface of the printed object is discharged, wherein the surface has a linear shape and the thickness of the surface refers to a thickness of a line.

6. Inner thickness (infill width over thickness): a thickness of the inside when the inside (filling) of the printed object is discharged, wherein a filament is discharged to the inside in a shape of multiple lines to improve durability so that the printed object does not collapse.

7. Printing speed: a speed at which the second ejection part 122 moves while discharging the filament.

Hereinafter, the numerical range of the parameters derived by the test was shown as in [Table 1] which will be described below.

TABLE 1

| Parameter | Numerical range | Optimum value |
|---|---|---|
| Nozzle temperature | 350 to 380° C. | 360° C. |
| Printing plate temperature | 170 to 220° C. | 190° C. |
| Lower plate temperature | 180 to 220° C. | 200° C. |
| Layer height | 0.2 to 0.3 mm | 0.25 mm |
| Surface thickness | 1.1 to 3 mm | 2.5 mm |
| Inner thickness | 1.1 to 3 mm | 2.5 mm |
| Printing speed | 30 to 80 mm/sec | 60 mm/sec |

1. Nozzle temperature: when the temperature of the second ejection part 122 is less than a predetermined value, the adhesive strength between layers of the printed object decreases and thus strength is degraded. Further, when the temperature is greater than the predetermined value, a discharge amount excessively increases, and thus surface quality of the printed object is degraded.

2. Printing plate temperature: when the temperature of the printing plate 300 on which the filament is seated is less than a predetermined value, a phenomenon is discovered in which the printed object is contracted and bent when seated or separated from the printing plate 300. Further, when the temperature of the printing plate 300 is greater than the predetermined value, a phenomenon is discovered in which the shape of a lower end of the printed object is not hardened and thus collapses or the bottom of the printed object is carbonized.

3. Lower plate temperature: when the temperature of the lower plate 232 is less than a predetermined value, a crack occurs due to a temperature difference between the upper end and the lower end of the printed object which is somewhat seated on the printing plate. Further, when the temperature of the lower plate 232 is greater than the predetermined value, the shape of the printed object is not hardened and thus collapses.

In this case, the printing plate temperature and the lower plate temperature are adjusted within the predetermined numerical range and may be adjusted to be similar to each other.

4. Layer height: when the height of one layer is less than a predetermined value, the strength of the printed object decreases, and when the height of one layer is greater than the predetermined value, a surface precision degree of the printed object decreases.

5. Surface thickness and inner thickness: when each of the surface thickness and the inner thickness is less than a predetermined value, probability at which a vacant space is formed in the printed object is high, and when each of the surface thickness and the inner thickness is greater than the predetermined value, the surface quality of the printed object is degraded.

6. Printing speed: the printing speed directly relates to productivity of products and was derived as an optimum test value with the above-described parameter.

Accordingly, the surface quality and the strength of the printed object were improved within the numerical range of the parameters, the shrinkage of the printed object decreased, and the printed object could be stably printed. Further, a problem, in which a waste of energy is large and a heating time is long because the conventional expensive equipment does not have configurations of the lower plate and the printing plate configured to heat the printed object from above and below unlike the present invention and thus is forcedly set to preheat a whole sealing space after increasing a temperature to 180° C., could be solved.

That is, excellent surface quality may be obtained without entirely preheating the air in the apparatus by applying the predetermined values of the parameters.

The above-described embodiments of the three-dimensional printer of a fused deposition modeling of the present invention are only exemplary embodiments, and it should be understood by those skilled in the art that various changes and other equivalent embodiments may be made from the above descriptions. Accordingly, the present invention may be understood to not be limited to the forms mentioned in the detailed descriptions. Accordingly, the scope of the present invention should be defined by the technical spirit of the appended claims. Further, the present invention should be understood to include the spirit of the present invention defined by the appended claims and all changes, equivalents, and substitutes within the above.

REFERENCE NUMERALS

100: nozzle part
110: first nozzle
111: first introduction hole
112: first ejection part
120: second nozzle
121: second introduction hole
122: second ejection part
130: first aluminum core
140: second aluminum core
150: mounting bar
151: fixing hole
200: cooling part
210: radiating plate
220: fan
230: transferring member
231: guide hole
232: lower plate
233: through hole
234: lower case
300: printing plate
310: flat plate
320: ceramic paper
330: silicon thermal plate
340: hard anodizing plate

The invention claimed is:

1. A three-dimensional printer for fused deposition modeling, comprising:
   a printing plate (300) comprising a silicon thermal plate (330);
   a nozzle part (100) configured to heat a filament to a sufficient temperature to eject the filament onto the printing plate (300);
   a means configured to move the nozzle part (100) relative to the printing plate (300) to allow the filament ejected from the nozzle part (100) to stack and to form a printed object on the printing plate (300); and
   a cooling part (200) provided on the nozzle part (100), the cooling part comprising a radiating plate (210), a fan (220) configured to cool the radiating plate (210), a transferring member (230) configured to couple the cooling part (200) and nozzle part (100) to the means, a lower plate (232) coupled to the transferring member (230), a ceramic paper attached to an upper surface of the lower plate (232), and a thermal plate (236) inserted into the lower plate (232), wherein the lower plate (232) has a through hole (233) and is coupled to the transferring member (230) such that a lower end of the nozzle part (100) is fitted in the through hole (233);

wherein the thermal plate (236) is arranged to face an upper side of the printed object and configured to generate heat that hardens the filament ejected from the nozzle part (100) and simultaneously locally heats the upper side of the printed object stacked on the printing plate (300);

wherein the ceramic paper is configured to direct the heat generated from the thermal plate (236) downwardly towards the upper side of the printed object and to insulate the transferring member (230) from the heat generated by thermal plate (236); and wherein the silicon thermal plate (330) is configured to generate heat that travels from a lower side of the printed object upwardly towards the upper side of the printed object to harden the filament ejected from the nozzle part (100) and simultaneously prevent shrinkage of the filament ejected from the nozzle part (100).

2. The three-dimensional printer of claim 1, wherein the nozzle part (100) includes a first nozzle (110) provided with a first introduction hole (111) connected to a nozzle tube (160) into which the filament is introduced and a first ejection part (112) configured to eject the filament, and a second nozzle (120) provided with a second introduction hole (121) connected to the nozzle tube (160) into which the filament is introduced and a second ejection part (122) made of a stainless steel (SUS) material and configured to eject the filament.

3. The three-dimensional printer of claim 2, wherein:
the first ejection part (112) is made of a brass material and ejects a filament made of a commodity plastic material having a melting temperature less than or equal to 270° C.; and the second ejection part (122) is made of the stainless steel material and ejects the filament made of a high-melting temperature engineering plastic material having a melting temperature greater than or equal to 300° C.

4. The three-dimensional printer of claim 1, wherein:
a temperature of the second ejection part (122) is set to 350 to 380° C.;

a temperature of the printing plate (300) is set to 170 to 220° C.;

a temperature of the lower plate (232) is set to 180 to 220° C.;

a height of a layer of the filament discharged from the second ejection part (122) is set to 0.2 to 0.3 mm;

a surface thickness and an inner thickness are set to 1.1 to 3 mm; and a printing speed is set to 30 to 80 mm/sec.

\* \* \* \* \*